Jan. 18, 1949.  G. KLEIN  2,459,657

ADJUSTABLE BROILER

Filed Jan. 7, 1948

Gustav Klein
INVENTOR

By Louis Necho
ATTORNEY

Patented Jan. 18, 1949

2,459,657

UNITED STATES PATENT OFFICE 2,459,657

ADJUSTABLE BROILER

Gustav Klein, Melrose Park, Pa., assignor to Caloric Stove Corporation, Philadelphia, Pa., a corporation of Pennsylvania Application January 7, 1948, Serial No. 971

2 Claims. (Cl. 99—393)

This invention relates to an adjustable broiler of the type usually incorporated in gas or electric cooking stoves for cooking food under the open gas flame or by the directly-radiated heat of an electric heating element.

One object of the invention is to produce an improved broiler of the type set forth.

A broiler usually includes a pan for receiving grease, juice, etc., which exude from the food being cooked, a grid or tray positioned on top of the pan for supporting such food, and means for supporting the broiler in the desired spaced relationship relative to the source of heat. The means for supporting the broiler is usually in the nature of fixed, vertically spaced ledges or tracks which may be mounted either on the vertical side walls of the broiler compartment, or on the inner faces of the vertical walls of a drawer which is slidably mounted in the broiler compartment.

The vertical adjustment of the food supporting grid by selectively positioning the drip pan on one or another of the vertically spaced tracks is limited by the spacing of the tracks and while this is satisfactory for most purposes, it is sometimes desirable to have a nicer adjustment of the food relative to the source of heat. For example, it may be that when the pan is supported on one of the tracks, the food on the grid will be too near to the source of heat, and it may be that positioning the drip pan on a lower track will move the food too far from the source of heat.

It is, therefore, a further object of the invention to produce a broiler assembly by means of which the position of the food relative to the source of heat can be more nicely adjusted without increasing the number of supporting tracks and without spacing the tracks too close to each other.

A still further object of the invention is to attain the improved adjustment described without appreciably adding to the cost of manufacture of the broiler.

These and other objects are attained by my invention as set forth in the following specification and as illustrated in the accompanying drawing in which.

Figure 1:
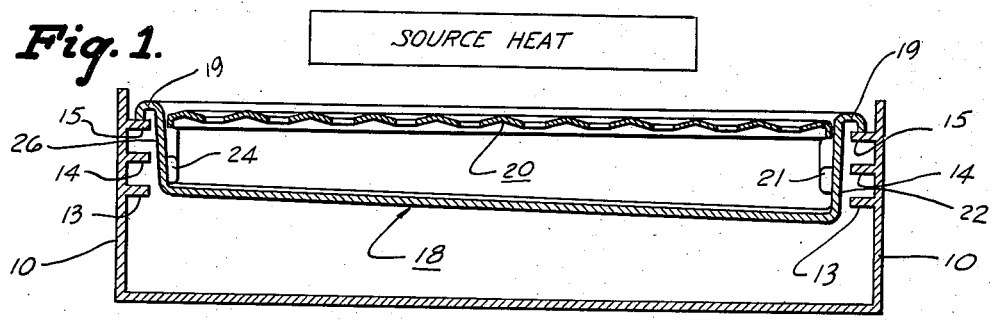
Fig. 1 is a transverse vertical sectional view of a broiler assembly embodying my invention, with the food supporting grid shown in its upper position relative to the drip pan.

In Fig. 1 of the drawings, the vertical side walls 10 may be the side walls of a broiler compartment provided in the structure of a cooking stove, or they may be the vertical side walls of a removable broiler drawer which is slidably mounted in the broiler compartment in any well known manner. In any event, the side walls 10 are provided with juxtaposed, horizontally registering pairs of fixed, vertically spaced ledges or tracks 13, 14, 15 and 16 which extend from the front, or door end, of the broiler towards the back wall thereof. The vertically spaced tracks are adapted to be engaged by the side flanges 19 of the drip pan 18 to support the drip pan at the desired point relative to the source of heat, as shown in Fig. 1.

Figure 2:
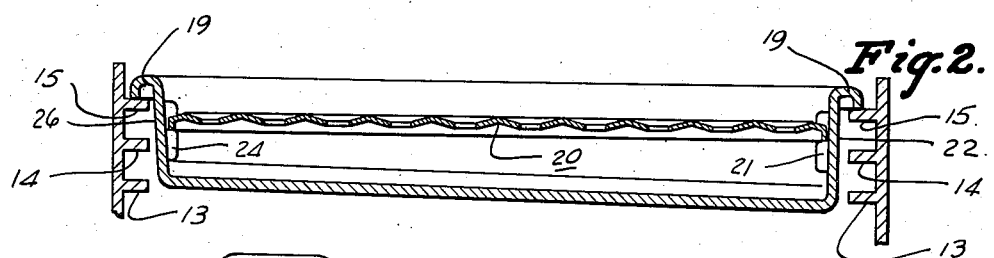
Fig. 2 is a similar view with the grid shown in its lower position relative to the drip pan.

According to my invention, I produce improved means whereby the position of the food relative to the source of heat may be adjusted with greater nicety than can be effected by the spacing of tracks 13, 14 and 15. As best illustrated in Fig. 1 of the drawing, I provide the drip pan 18 with inverted T-shaped bosses 21 which project inwardly from the side wall 22 of the drip pan 18, and with the bosses 24 which project inwardly from the opposite side wall 26 of the drip pan. The bosses 21 and 24 are preferably struck up from the respective walls of the pan, and their transverse heads are disposed close to the bottom of the drip pan. Also, the bosses 21 are out of alignment with the bosses 24, as best shown in Fig. 2. The grid is preferably undulated, as shown in Fig. 1, and is provided with openings to allow grease, juice, etc., to fall into the drip pan. Also, the length and width of the grid is such that, in the absence of the bosses 21 and 24, the grid 20 will pass freely downwardly between the vertical walls of the drip pan.

In order to permit adjustment of the grid relative to the bottom of the drip pan, the grid is provided with notches 28 and 30 which are large enough to permit the stems, but not the transverse heads, of the inverted T-shaped bosses 21 and 24 to pass freely therethrough. It will be noted that the notches 28 and 30 are out of alignment with each other and that they register with the side bosses 21 and 24 in one position of the grid, and are out of registration with said bosses when the position of the grid is reversed, end to end.

Operation

When it is desired to locate the grid near the bottom of the drip pan, the grid is so held above the pan that the notches 28 are in registration with the bosses 21, and the notches 30 are in registration with the bosses 24. The grid 20 is now lowered so to cause the stems of the inverted T-shaped bosses to pass upwardly through the corresponding notches 28 and 30 until the grid comes to rest on the transverse heads of the bosses, as shown in Fig. 2. This lowers the grid and the food thereon relative to the source of heat, without changing the position of the drip pan itself relative to the walls 10.

When it is desired to raise the food relative to the source of heat, without changing the position of the drip pan relative to the broiler compartment walls 10, the position of the grid is reversed longitudinally, or end to end, relative to the drip pan so that the notches 28 and 30 will be out of registration with the stems of the inverted T-shaped bosses 21 and 24. Therefore when the grid is lowered onto the drip pan, the marginal portions thereof will come to rest on the upper ends of the stems of the inverted T-shaped bosses. In this position, the grid will be raised relative to the bottom of the drip pan, as shown in Fig. 1, thus bringing the food on the grid closer to the source of heat without changing the position of the pan itself.

Figure 3:
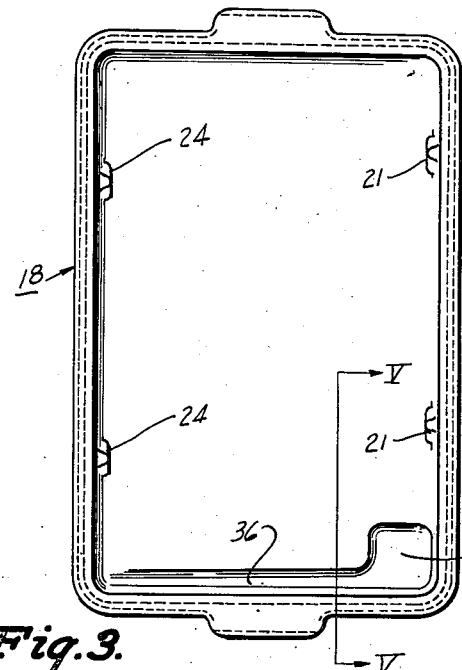
Fig. 3 is a top plan view of the drip pan with the grid removed.
Figure 4:
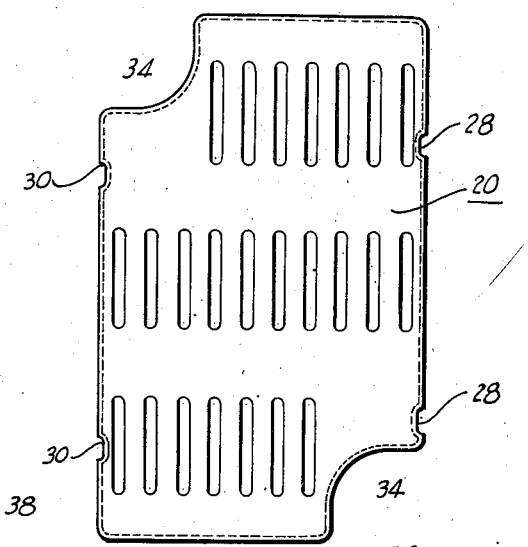
Fig. 4 is a top plan view of the grid removed from the drip pan.
Figure 5:
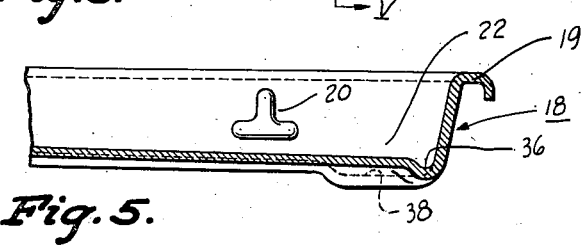
Fig. 5 is a fragmentary vertical sectional view showing details of construction.

The grid is also provided with large end notches 34 which permit grasping of the grid by hand or by means of a suitable tool. As best shown in Figs. 1, 3 and 5, the bottom of the drip pan slopes gently, from back to front, and from left to right, or to the lower, right hand corner as viewed in Fig. 3. Also, the front end of the drip pan is provided with a gutter 36 which flares progressively, from left to right, and terminates in a well 38 for collection of grease, juice, etc., which may fall into the drip pan from the food being cooked.

It will be noted that the notches 34 are arranged diagonally so that, regardless of whether the grid is in the position of Fig. 1 or of Fig. 2, one of the notches 34 will register with the well 38. The notches 34 are large enough to permit the use of a spoon or ladle for basting the food on the grid with the juices collected in the well 38.

It will be noted that, when the grid is to be moved to the lower position of Fig. 2, the engagement of the stems of the inverted T-shaped bosses with the notches 30 and 31 guides the grid to a position of rest on the transverse horizontal portions of the bosses.

Having thus described my invention, what I claim is:

1. For use in an oven, a cooking device including a drip pan having vertical side and end walls and a bottom wall, said drip pan being adapted to be mounted in said oven in vertically adjustable relation relative to a source of heat, a grid for supporting food to be cooked above the bottom of said drip pan, said grid being of a size to pass freely between the vertical walls of said drip pan, and means for varying the height of said grid relative to said source of heat, without changing the position of said drip pan, said means including a pair of inverted T-shaped bosses projecting inwardly from each of two opposite vertical walls of said drip pan, with the bosses on one of said walls out of alignment with the other pair of said bosses, the transverse heads of said bosses being near the bottom of said drip pan and the ends of the stems of said bosses being near the top of said drip pan, said grid having notches in corresponding walls thereof, said notches corresponding, respectively, to said bosses and being large enough to permit passage of only the stems of the bosses but not the transverse heads thereof whereby when said grid is lowered, in one position, towards the bottom wall of said drip pan, the stems of said bosses register with and pass through said notches and said grid occupies a position in close proximity to the bottom of said drip pan, and whereby when said grid is lowered, end to end, in reversed position, toward the bottom wall of said drip pan, said stems of said bosses, are out of registration with said notches and said grid is supported by said stems near the top of said drip pan, said drip pan having a bottom well formed near a corner thereof for collecting liquids exuded from the food being cooked, and said grid having diagonally opposite corner notches one of which registers with said well in either position of the grid relative to the drip pan.

2. For use in an oven, a cooking device including a drip pan having vertical side and end walls and a bottom wall, said drip pan being adapted to be mounted in said oven in vertically adjustable relation relative to a source of heat, a grid for supporting food to be cooked above the bottom of said drip pan, said grid being of a size to pass freely between the vertical walls of said drip pan, and means for varying the height of said grid relative to said source of heat, without changing the position of said drip pan, said means including a pair of inverted T-shaped bosses projecting inwardly from each of two opposite vertical walls of said drip pan, with the bosses on one of said walls out of alignment with the other pair of said bosses, the transverse head of said bosses being near the bottom of said drip pan and the ends of the stems of said bosses being near the top of said drip pan, said grid having notches in corresponding walls thereof, said notches corresponding, respectively, to said bosses and being large enough to permit passage of only the stems of the bosses but not of the transverse heads thereof whereby when said grid is lowered, in one position, towards the bottom wall of said drip pan, the stems of said bosses register with and pass through said notches and said grid occupies a position in close proximity to the bottom of said drip pan, and whereby when said grid is lowered, in end to end reversed position, toward the bottom wall of said drip pan, said stems of said bosses, are out of registration with said notches and said grid is supported by said stems near the top of said drip pan.

GUSTAV KLEIN.

No references cited.